United States Patent
Podvin et al.

(10) Patent No.: US 10,908,557 B2
(45) Date of Patent: *Feb. 2, 2021

(54) ESCAPE VALVE FOR A WATCH

(71) Applicant: OMEGA SA, Biel/Bienne (CH)

(72) Inventors: Pierre Podvin, Morges (CH); Jean Baebler, Guemligen (CH)

(73) Assignee: OMEGA SA, Biel/Bienne (CH)

( * ) Notice: Subject to any disclaimer, the term of this patent is extended or adjusted under 35 U.S.C. 154(b) by 128 days.

This patent is subject to a terminal disclaimer.

(21) Appl. No.: 16/164,861

(22) Filed: Oct. 19, 2018

(65) Prior Publication Data

US 2019/0137936 A1    May 9, 2019

(30) Foreign Application Priority Data

Nov. 8, 2017 (EP) .................................... 17200597

(51) Int. Cl.
| | | |
|---|---|---|
| *G04B 37/08* | (2006.01) | |
| *F16K 17/04* | (2006.01) | |
| *G04B 37/10* | (2006.01) | |

(52) U.S. Cl.
CPC ............ *G04B 37/088* (2013.01); *F16K 17/04* (2013.01); *G04B 37/103* (2013.01)

(58) Field of Classification Search
CPC ...... G04B 37/088; G04B 37/02; G04B 37/10; G04B 37/103; G04B 37/106; F16K 17/02
USPC ......... 368/291, 289–290, 288, 308, 319–321
See application file for complete search history.

(56) References Cited

U.S. PATENT DOCUMENTS

| | | | |
|---|---|---|---|
| 4,292,682 A * | 9/1981 | Wenger ................ | G04B 37/106 368/289 |
| 5,257,247 A | 10/1993 | Miche et al. | |
| 6,137,750 A * | 10/2000 | Rieben ................. | G04B 37/103 368/290 |
| 6,200,020 B1 | 3/2001 | Rieben | |
| 9,123,483 B2 * | 9/2015 | Ferri ...................... | H01H 13/06 |

(Continued)

FOREIGN PATENT DOCUMENTS

| | | |
|---|---|---|
| EP | 0 554 797 A1 | 8/1993 |
| EP | 0 884 660 A1 | 12/1998 |
| EP | 2 166 420 A2 | 3/2010 |

OTHER PUBLICATIONS

European Search Report dated May 7, 2018 in European Application 17200597.7, filed on Nov. 8, 2017 ( with English Translation of Categories of Cited Documents).

*Primary Examiner* — Edwin A. Leon

(74) *Attorney, Agent, or Firm* — Oblon, McClelland, Maier & Neustadt, L.L.P.

(57) ABSTRACT

The invention relates to an escape valve for a timepiece including an outlet channel arranged to be capable of being in fluid communication with the interior of a case of the timepiece when the valve is in an open configuration to evacuate an excess of fluid. The valve includes a tube to be fixed in the case of the timepiece and a valve head provided with a cover and an axial skirt adapted to be placed in different axial positions, a pressure control module separate from the valve head arranged in the interior of a fluid conduit provided in the tube and axial guide elements by screwing defined in the valve head and the tube playing a part in the control of the displacement of the valve head relative to tube in the different axial positions, blocking elements preventing a disassociation between the valve head and the tube.

16 Claims, 8 Drawing Sheets

(56) References Cited

U.S. PATENT DOCUMENTS 10,152,024 B2 * 12/2018 Baebler ................ G04B 37/103
2019/0137937 A1 * 5/2019 Podvin ................. G04B 37/103

* cited by examiner

ESCAPE VALVE FOR A WATCH

CROSS-REFERENCE TO RELATED APPLICATION

This application claims priority of European Patent Application No. 17200597.7 filed on Nov. 8, 2017 the entire disclosure of which is incorporated herein by reference.

TECHNICAL FIELD

The present invention relates to an escape valve for a timepiece, in particular a wristwatch, and more particularly for a wristwatch intended for scuba diving. The present invention also relates to the timepiece equipped with said valve.

TECHNOLOGICAL BACKGROUND

Helium valves, also referred to as helium valves, are present in certain diver's watches in order to evacuate the helium infiltrated into the watch case in the course of dives known as saturation dives, where the divers breathe a gaseous mixture containing helium and oxygen. This permits them to remain in the interior of a bell or an underwater station for several days. During this period of time, the helium may infiltrate into the watch. In the absence of a suchlike valve, the internal overpressure generated by the infiltrated helium may cause damage to the watch during the decompression phase, for example the loss of the glass which is pushed out or broken.

In the state of the art, manual helium valves are known which operate simply by tightening/untightening a sealing element such as a valve head, in the manner of a crown screwed onto a tube that is pressed or screwed into the case middle. Suchlike valves conventionally include a piston connected to the valve head which is adapted to exert a pressure on a seal while cooperating with a spring in order to regulate the pressure in the interior of the watch case.

However, one of the major shortcomings of suchlike manual valves lies in a possible deterioration of the sealing of the watch case when these valves are in an opening configuration in which the valve head is untightened. In fact, in a suchlike configuration, as soon as a radial or substantially radial force, possibly occurring as the result of an impact, is applied to the valve head, it then has the effect of producing misalignment of the piston bringing about a reduction in the pressure exerted by the piston on the seal and thus a loss of sealing of the watch case.

SUMMARY OF THE INVENTION

One aim of the present invention is to address the shortcomings of the prior art by proposing a valve in which the piston is separate from the valve head while providing means ensuring an association of the valve head with the tube, a suchlike valve head being easily manipulated in the course of tightening/untightening operations.

For this purpose, the present invention relates to an escape valve for a timepiece, in particular for a diver's watch, comprising an outlet channel arranged to be in fluid communication with the interior of a case of said timepiece when this valve is in an open configuration in order to evacuate an excess of fluid, in particular a gaseous fluid, said valve containing:

a tube intended to be fixed in the case of the timepiece;
a valve head provided with a cover and with an axial skirt which is adapted to be placed in different axial positions in relation to said tube;
a pressure control module separate from the valve head arranged in the interior of a fluid conduit provided in the tube;
axial guide elements by screwing defined in the valve head and the tube playing a part in the control of the displacement of the valve head relative to tube in the different axial positions, said escape valve comprising blocking elements preventing a disassociation between the valve head and said tube, said blocking elements being included in an internal wall or external wall of the tube and in the valve head.

Thanks to these characterizing features, the effect associated with the application of a radial or substantially radial force to the valve head in particular is eliminated and with it the risks of loss of sealing of the valve and thus of the watch case.

In other embodiments:
the blocking elements include an abutment included in the internal wall of the fluid conduit of said tube and a means of controlling the course of the valve head intended to cooperate with said abutment when the valve head is displaced relative to tube in particular in order to prevent a disassociation between the valve head and said tube;
the means of controlling the course of the valve head is an element inserted in the body of this valve head which is connected mechanically to an interior wall of a central connecting element of this valve head;
the abutment is integrally formed with the internal wall of the fluid conduit of said tube;
the abutment is included in an insert fixed on an internal wall of the fluid conduit of said tube;
the blocking elements are included in the external wall of the tube and in the axial skirt of the valve head;
the blocking elements include a retaining ring of annular form and a circular shoulder, said shoulder being provided with a bearing surface against which said ring is likely to come into abutment;
the retaining ring is included in a groove of complementary form defined in the axial skirt when the circular shoulder is included in the external wall of the tube;
the retaining ring is included in a groove of complementary form defined in the external wall of the tube when the circular shoulder is included in the axial skirt;
the axial guide elements include first and second guide zones defined in whole or in part respectively in a central connecting element included in the cover of the valve head and in the internal wall of the fluid conduit of the tube, in particular in an upper compartment of this conduit;
the axial guide elements include first and second guide zones defined in whole or in part respectively in a central connecting element included in the cover of the valve head and in an insert fixed on an internal wall of the fluid conduit of said tube;
the first and second guide zones are adapted to be in engagement by screwing for an open or closed configuration of said valve;
the pressure control module includes a piston and an elastic member, said piston being housed in the interior of the fluid conduit of the tube and the elastic member being arranged in said fluid conduit in order to cooperate with the piston, said piston being configured in order to move axially depending on the variations of pressure in the interior of the case;

the pressure control module includes a sealing element situated in the fluid conduit between first and second elements of fixation, said sealing element containing a membrane arranged to be permeable to the gases and to establish a fluid communication from the interior of the case towards the exterior when said internal pressure exceeds a predetermined value and impermeable to the liquids circulating from the exterior of the case towards the interior of the case, and the valve includes a visual indicator of an axial position of the valve head relative to the tube, in particular from a first or from a second axial position of this valve head.

The invention also proposes a timepiece comprising a suchlike escape valve.

BRIEF DESCRIPTION OF THE FIGURES

Other characterizing features and advantages of the present invention will be appreciated from a perusal of the embodiments of the invention that are given only by way of non-exhaustive example and are described with reference to the accompanying drawings, in which.

DETAILED DESCRIPTION OF THE INVENTION

Figure 9:
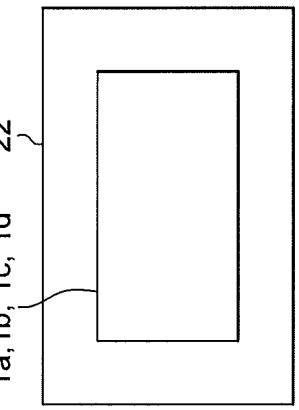
FIG. 9 represents the timepiece comprising a suchlike escape valve.
Figure 8:
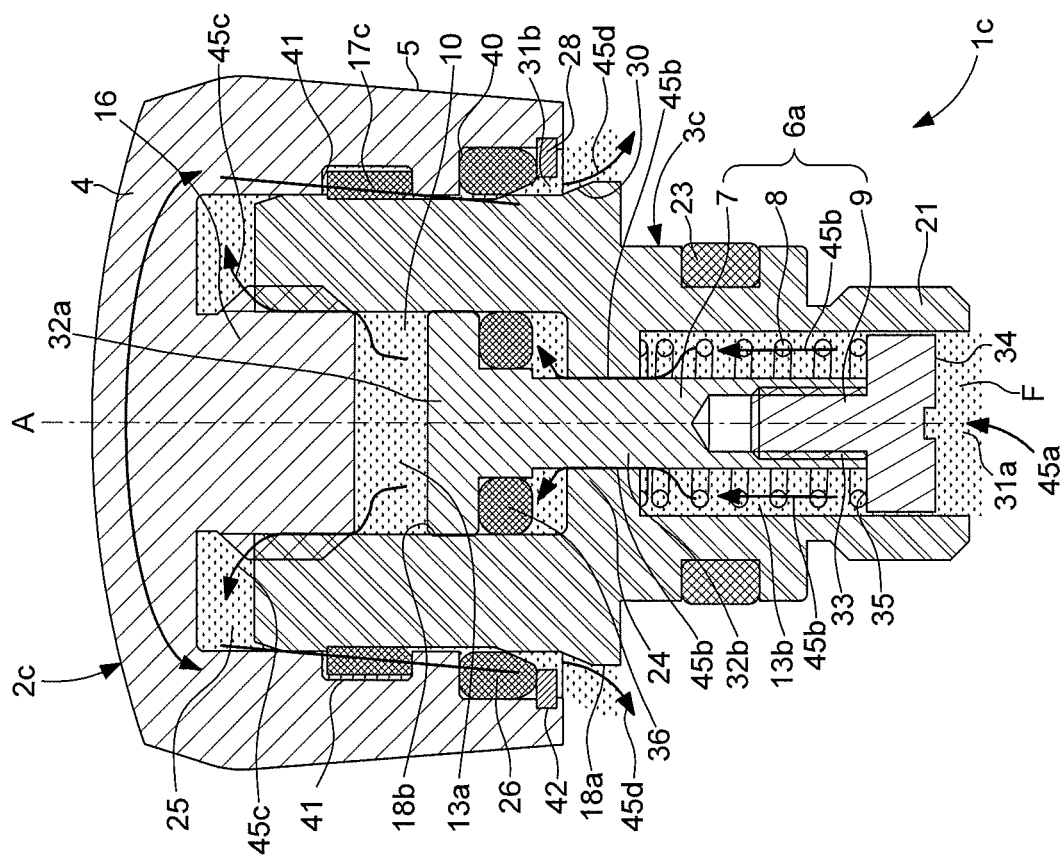
FIG. 8 represents a cross-sectional view of the escape valve visible in FIG. 5 which is traversed by a fluid circulating in an evacuation pipe, according to the third embodiment of the invention.

The present invention relates to a valve making it possible to evacuate an excess of preferably gaseous fluid F such as helium present in a case of a timepiece 22 illustrated in FIG. 9. A suchlike valve is also referred to as a helium valve or even an escape valve for a timepiece 22, and in particular for a diver's watch. This valve is designated by the general reference 1a, 1b, 1c, 1d in the drawings.

In the four embodiments of the escape valve 1a to 1d represented in FIGS. 1 to 8, this valve 1a to 1d includes a tube 3a, 3b, 3c, 3d intended to be fixed on the watch case by screwing or pressing in the case middle 20 of this case. When this tube 3a to 3d is screwed to the case middle, it contains a threaded zone 21 defined in a lower portion included in this case middle 20. This tube 3a to 3d possesses in its median part a bulge provided with a groove in which is housed an O-ring 23 ensuring sealing thereof at the level of the case middle 20. In the illustrated example, the tube 3a to 3d is terminated by an upper portion emerging from the case middle 20, intended to be capped by a valve head 2a, 2b, 2c, 2d. It is self-evident that, according to a variant embodiment, the tube 3a to 3d may be embedded in the case middle 20.

In the first, second and third embodiments of escape valve 1a, 1b, 1c illustrated in FIGS. 1 to 5, the tube 3a, 3b, 3c includes a fluid conduit 10. This fluid conduit 10 is provided with an internal bearing surface 24 delimiting an upper compartment 13a of a lower compartment 13b of this conduit 10, the lower compartment 13b comprising a canal connected to the interior of the case. It should be noted that this bearing surface 24 may be an insert (visible in FIGS. 1, 2) or may be integrally formed with an internal wall 18b of the tube 3a, 3b, 3c (visible in FIGS. 3, 4, 5).

In the different embodiments of the valve 1a to 1d, the valve head 2a to 2d exhibits a body of cylindrical general form. This valve head 2a to 2d includes a cover 4 and an axial skirt 5 exhibiting rotational symmetry about an axis of rotation A of this valve head 2a to 2d. This cover 4 and the axial skirt 5 define a cavity 25 in the valve head 2a to 2d.

In this valve head 2a to 2d, the cover 4 includes a central connecting element 16 projecting from an internal face of this cover 4 while extending axially in this cavity 25 in a direction of the axis A. In this configuration, a suchlike central connecting element 16 is thus integral with the cover 4 and preferably has a transverse section perpendicular to the axis A which is circular. In FIGS. 1 to 3, 6 and 7 relating to first, second and fourth embodiments of the valve 1a, 1b, 1d, this central connecting element 16 may form a central bushing having the form of a hollow cylinder intended for installation in the valve head 2a, 2b, 2d of a means of controlling 17b the course of this valve head 2a, 2b, 2d. A suchlike means of controlling 17b the course of the valve head 2a, 2b, 2d is an element inserted into the body of this valve head 2a, 2b, 2d. This means of controlling 17b is connected mechanically to an interior wall 19a of the central connecting element 16 at the level of one of its extremities and, for example by screwing.

Figure 3:
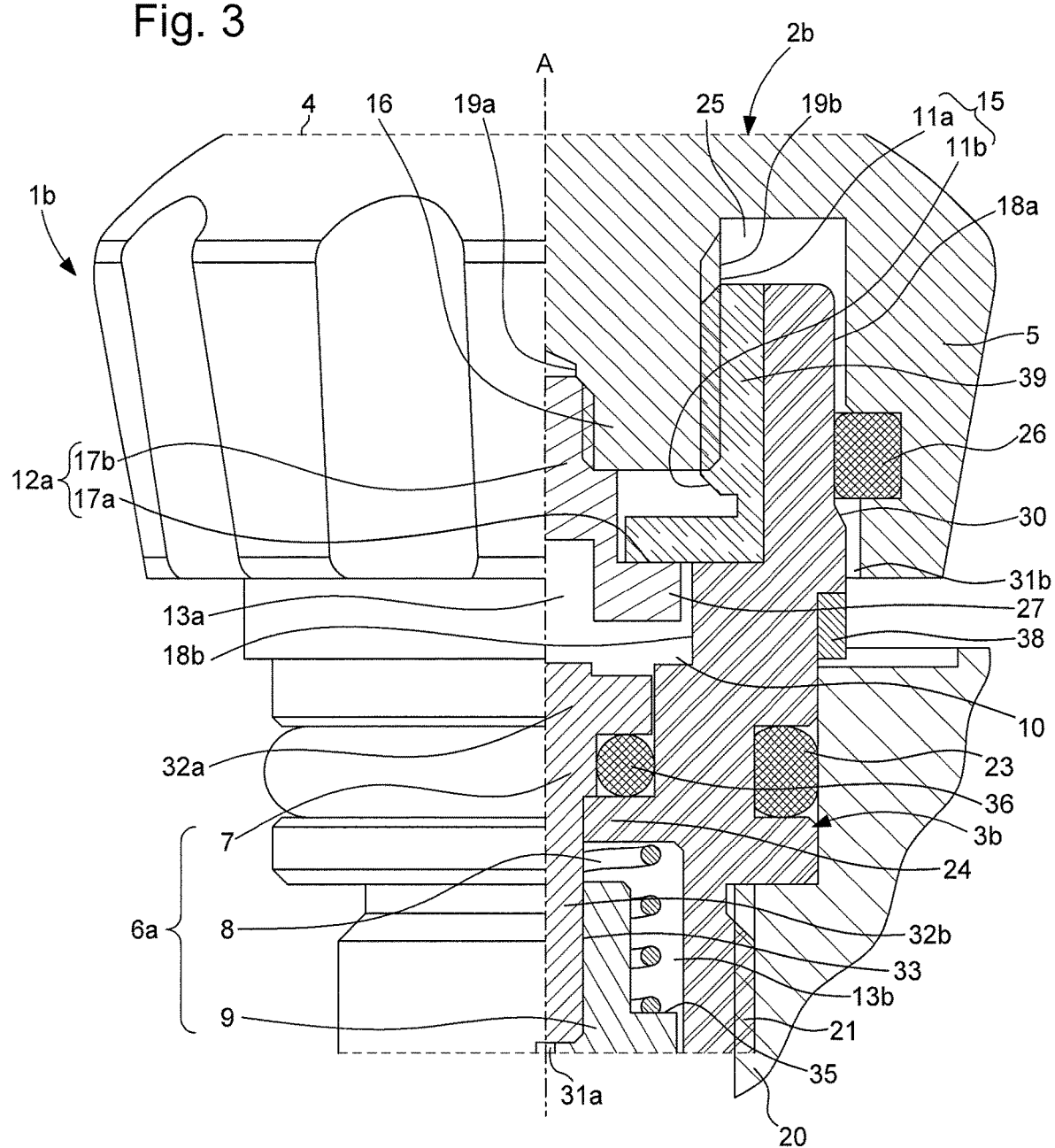
FIG. 3 is a half-sectioned view of an escape valve capable of being mounted on the case middle of the watch case in an open configuration comprising a pressure control module provided with a piston, according to a second embodiment of the invention.
Figure 4:
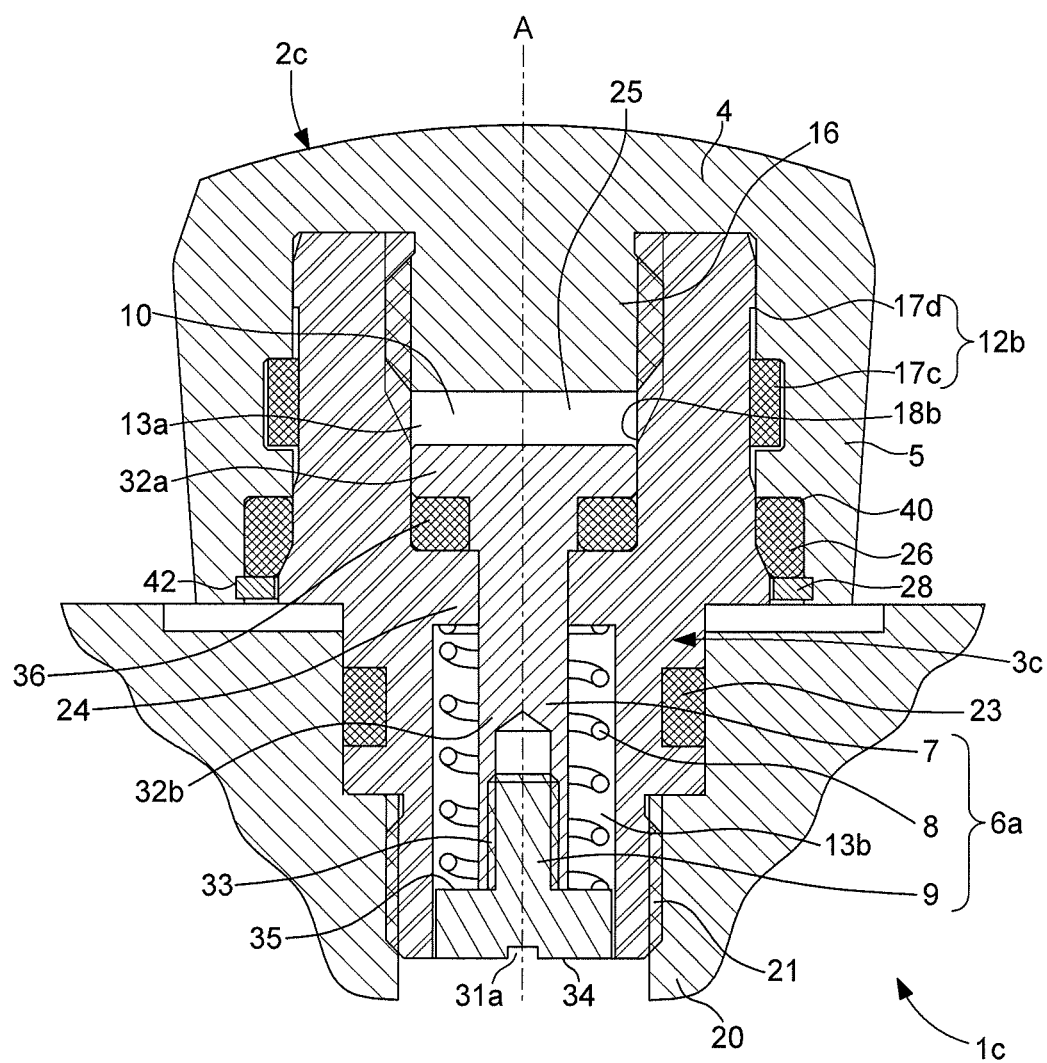
FIG. 4 is a cross-sectional view of an escape valve capable of being mounted on a case middle of the watch case in a closed configuration comprising a pressure control module provided with a piston, according to a third embodiment of the invention.
Figure 5:
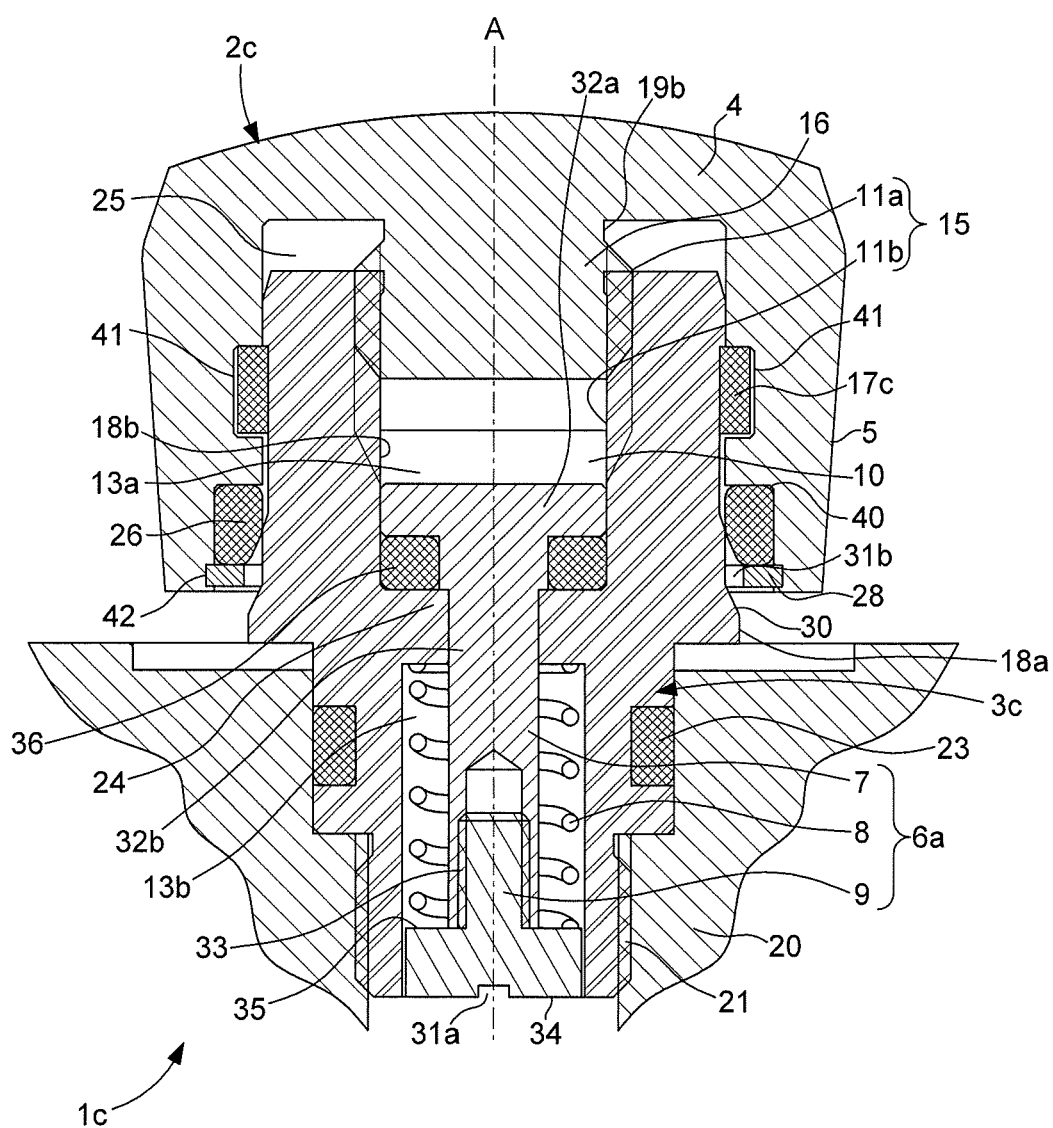
FIG. 5 represents a view similar to FIG. 4 in which the escape valve is in an open configuration, according to the third embodiment of the invention.

The escape valve 1a to 1d, furthermore, contains a seal 26 interposed between the axial skirt 5 of the valve head 2a to 2d and the tube 3a to 3d such as to guarantee the sealing of this escape valve 1a to 1d. In this context, this seal 26 is an O-ring. In FIGS. 1, 2, 6 and 7 relative to the first and fourth embodiments of this escape valve 1a, 1d, this seal 26 is maintained axially between a spacer 29 positioned against an interior wall of the axial skirt 5 of the valve head 2a, 2d and a retaining ring 28. This retaining ring 28 of annular form is fixed, for example by driving-in, in a groove 42 of corresponding form situated towards the base of the axial skirt 5 facing towards the external wall 18a of the tube 3a, 3d. According to a variant, the spacer 29 and/or the retaining ring 28 may be integral with the axial skirt 5. In FIG. 3 relative to the second embodiment of the escape valve 2b, a suchlike joint 26 is arranged in a groove made in the axial skirt 5. In FIGS. 4 and 5 relative to the third embodiment of the escape valve 1c, a suchlike seal 26 is arranged between a circular shoulder 40 made in the axial skirt 5 and a retaining ring 28 of annular form.

Figure 1:
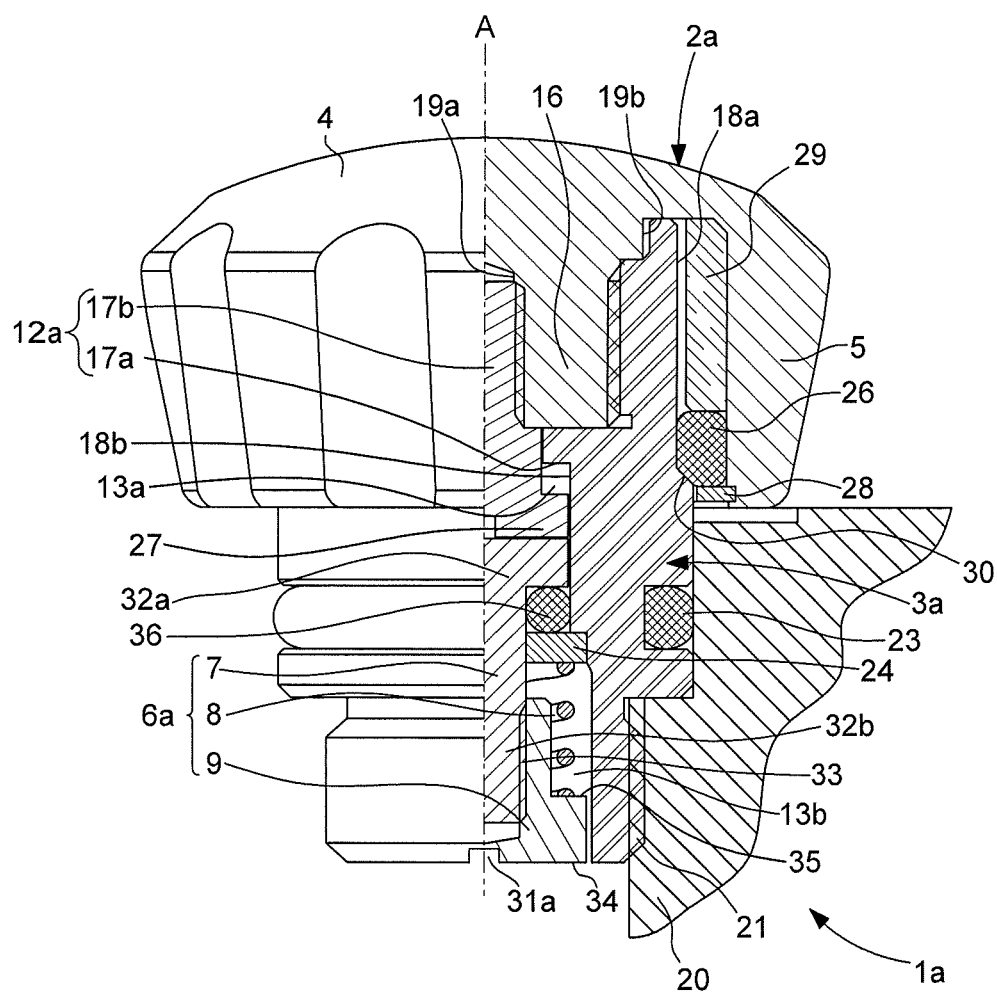
FIG. 1 is a half-sectioned view of an escape valve capable of being mounted on a case middle of a watch case in a closed configuration comprising a pressure control module provided with a piston, according to a first embodiment of the invention.
Figure 2:
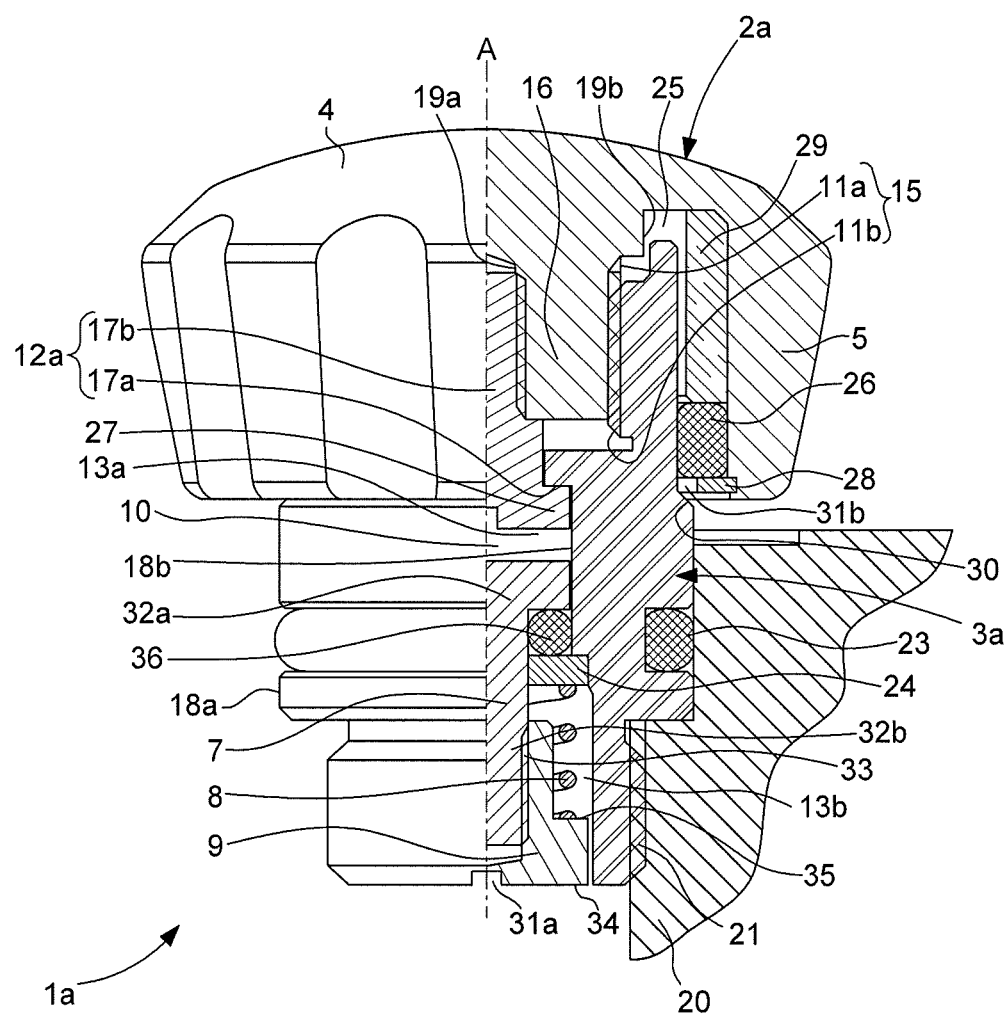
FIG. 2 represents a view similar to FIG. 1 in which the escape valve is in an open configuration, according to the first embodiment of the invention.
Figure 6:
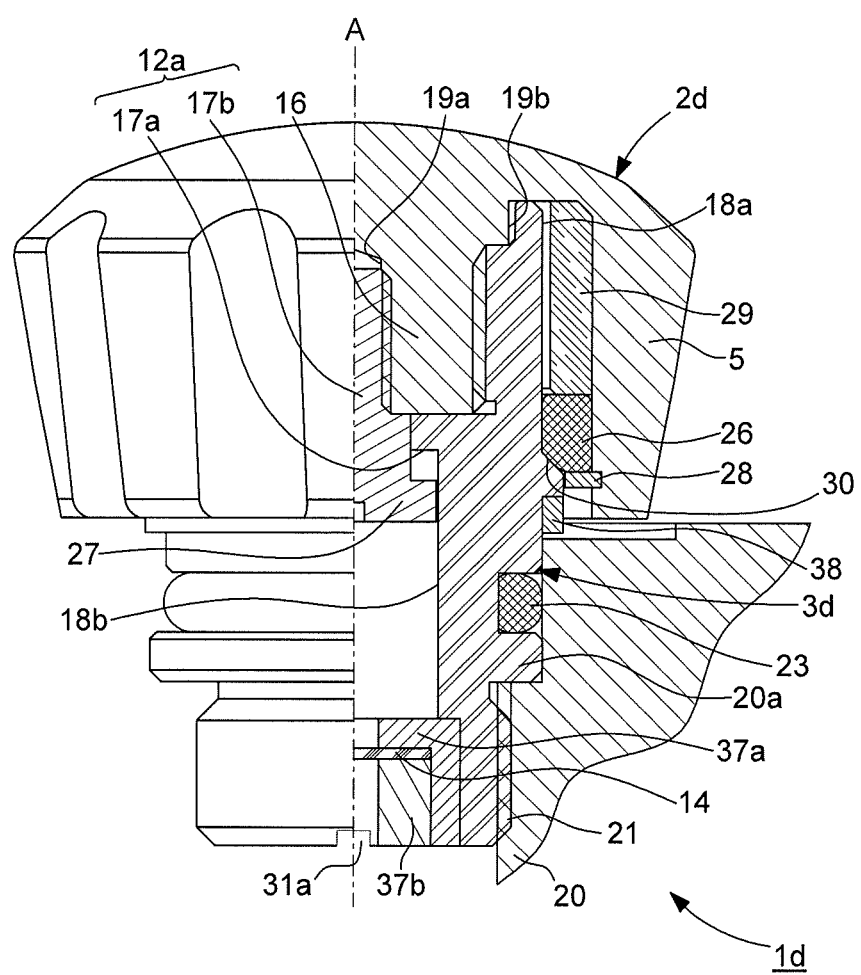
FIG. 6 is a half-sectioned view of an escape valve capable of being mounted on a case middle of a watch case in a closed configuration comprising a pressure control module provided with a sealing element containing a membrane, according to a fourth embodiment of the invention.

In these different embodiments, when the escape valve 1a to 1d is in a closed configuration visible in FIGS. 1, 4 and 6, the seal 26 is over compressed by a bulge 30 of the tube 3a to 3d such that the sealing properties are the best possible.

In this valve 1a to 1d, the valve head 2a to 2d may be configured in first and second axial positions. More particularly, in the first axial position represented in FIGS. 1, 4 and 6, the valve 1a to 1d is then in a closed configuration, with a valve head 2a to 2d closing the fluid conduit 10 of the tube 3a to 3d in a hermetic manner so as to prevent all circulation of fluid F in the escape valve 1a to 1d. In the second axial position represented in FIGS. 2, 3, 5, 7 and 8, the valve 1a to 1d is in an open configuration with the valve head 2a to 2d which no longer obstructs this fluid conduit 10.

The escape valve 1a to 1d also includes axial guide elements 15 permitting the axial displacement of the valve head 2a to 2d relative to the tube 3a to 3d to be controlled in order to configure this head 2a to 2d in one or other of its axial positions. These guide elements 15 contain first and second guide zones 11a, 11b defined in whole or in part respectively in an external wall 19b of the central connecting element 16 included in the cover 4 of the valve head 2a to 2d, and in the internal wall 18b of the fluid conduit 10 of the tube 3a to 3d. In the first, second and third embodiments, this second guide zone 11b is included in the internal wall 18b of the upper compartment 13a of the fluid conduit 10. It should be noted in particulier that, in the second embodiment, this second guide zone 11b is included in an insert 39 fixed on the internal wall 18b of the fluid conduit 10. Each of these first and second guide zones 11a, 11b includes a thread to ensure that the valve head 2a to 2d is always in engagement with the tube 3a to 3d during the open or closed configuration of said valve 1a to 1d. In this context, the escape valve 1a to 1d may be parameterized by the closed configuration to the open configuration by unscrewing the valve head 2a to 2d, the inverse operation requiring to be implemented for the passage of the open configuration to the closed configuration.

This escape valve 1a to 1d also includes blocking elements 12a, 12b preventing a disassociation between the valve head 2a to 2d and the tube 3a to 3d in particular when the valve head 2a to 2d is in the second axial position. In this valve 1a to 1d, the blocking elements 12a, 12b are included in an external wall or an internal wall 18a, 18b of the tube 3a to 3d as well as in the valve head 2a to 2d.

More particularly, in the first, second and fourth embodiments, the blocking elements 12a include an abutment 17a otherwise known as an "abutment for limiting the course of the valve head". This abutment 17a is included in the internal wall 18b of the fluid conduit 10 of the tube 3a, 3b, 3d. These blocking elements 12a also include the means of controlling 17b the course of the valve head 2a, 2b, 2d mentioned previously, which is also intended to cooperate with the abutment 17a when the valve head 2a, 2b, 2d is displaced relative to the tube 3a, 3b, 3d to be in the second axial position in order to parameterize the valve 1a, 1b, 1d in its open configuration. It should be noted that, in the first and fourth embodiments, this abutment 17a is integrally formed with the internal wall 18b of the fluid conduit 10 of the tube 3a, 3d (visible in FIGS. 1, 2, 6 and 7) or may be, as in the second embodiment, be included in the insert 39 which is fixed on an internal wall 18b of this fluid conduit 10 and which also contains the second guide zone 11b (visible in FIG. 3).

In the third embodiment of this escape valve illustrated in FIGS. 4 and 5, the blocking elements 12b include a retaining ring 17c of annular form and a circular shoulder 17d. This ring 17c exhibits a transverse section of essentially rectangular form and is preferably contained in a groove 41 of complementary form defined in the axial skirt 5. This groove 41 is preferably situated in a central part of the axial skirt 5. With respect to the circular shoulder 17d, it is included in the external wall 18a of the tube 3c and contains a bearing surface against which the ring 17c may come into abutment. In a variant of this embodiment, the ring 17c may be contained in a groove of complementary form defined in the external wall 18a of the tube 3a and the circular shoulder 17d defined in the axial skirt 5.

In these embodiments, a suchlike escape valve 1a to 1d includes an outlet channel arranged to be in fluid communication with the interior of the case when the valve 1a to 1d is in its open configuration in order to evacuate the excess of fluid F. This outlet channel includes the fluid conduit 10 defined in the tube 3a to 3d and a fluid passage included between the external wall 18a of this tube 3a to 3d and an interior wall of the axial skirt 5 of the valve head 2a to 2d. This outlet channel includes an inlet 31a included at the level of an opening defined in the lower portion of the tube 3a to 3d and an outlet 31b included between the interior wall of the base of the axial skirt 5 and the external wall 18a of the tube 3a to 3d.

Furthermore, in these embodiments, the escape valve 1a to 1d also includes a pressure control module 6a, 6b which is separate from the valve head 2a to 2d. In particular, in the first, second and third embodiments, the pressure control module 6a of the escape valve 1a, 1b, 1c includes a piston 7, an elastic member 8 and an actuating means of the piston 7. In this pressure control module 6a, the piston 7 is housed in the fluid conduit 10 defined in the tube 3a, 3b, 3c. This piston 7, which is mounted in a sliding manner in this tube 3a, 3b, 3c, has an essentially cylindrical form and includes two parts 32a, 32b. The first part 32a includes a head of the piston which is arranged in the upper compartment 13a of the fluid conduit 10 of the tube 3a, 3b, 3c and which is adapted to cooperate with the internal wall 18b of this compartment 13a in order to contribute to the guiding of the piston 7 in the course of its displacements in this conduit 10. With respect to the second part 32b, it is positioned both in a central opening provided in the interior bearing surface 24 and in the lower compartment 13b of the fluid conduit 10. This second part 32b of the piston 7 includes a free extremity intended to receive the actuating means 9 of the piston 7.

A suchlike actuating means 9 is intended to be in contact with the fluid F. It includes a connection component 33 permitting its attachment to the free extremity of the second part 32b of the piston 7 to be assured. This connection component 33 may have a cylindrical form and may contain, on an internal wall, a threaded part screwed into a tapped part of this free extremity of the second part 32b of the piston 7. This actuating means 9 includes a bearing surface 34 on which the fluid F originating from the case is likely to exert a pressure force. This bearing surface 34 is adapted to obstruct partially or totally the inlet 31a of the outlet channel.

In this pressure control module 6a, the elastic member 8, for example a compression spring of the helicoidal type, is adapted to be traversed by the second part 32b of the piston 7 by being arranged in the lower compartment 13b of the fluid conduit 10 of the tube 3a, 3b, 3c. In this lower compartment 13b, the spring includes first and second extremities which respectively bear against the interior bearing surface 24 and a supporting face 35 of the actuating means 9 which may be parallel to the bearing surface 34. In this lower compartment 13b, the spring is mounted in an axially compressed manner between the interior bearing surface 24 and the supporting face 35 in such a way that the head of the piston 32a is able to pinch an O-ring 36 against the interior bearing surface 24 in order to assurer the sealing of the escape valve 1a, 1b, 1c.

Thus, in this configuration, given the presence of an overpressure in the interior of the case, the fluid F, in this particular case the gaseous helium, comes into contact with the bearing surface 34 of the actuating means 9. To the extent that the pressure force exerted on the bearing surface 34 is greater than or equal to a threshold pressure force for the activation of the escape valve 1a, 1b, 1c, the actuating means 9 causes a displacement of the piston 7 against an elastic return force of the spring, thereby causing its deformation and a passage of the fluid F from the lower compartment 13b towards the upper compartment 13a via the central opening of the bearing surface 24 for the evacuation of this fluid F through the outlet 31b of the outlet channel. This threshold pressure force which induces the activation/triggering of the escape valve 1a, 1b, 1c, may be adapted to the circumstances of use of the valve 1a, 1b, 1c, this adaptation being realized by the choice of a stiffness of the pressure spring and/or a configuration of the dimensions of the surface of the bearing surface 34 of the actuating means 9 of the piston 7.

In this configuration, it should be noted that the top of the first part 32a of the piston 7 forming the head of this piston may have a complementary form (for example a square) to that of a part of a free extremity 27 (hollow) of the means of controlling 17b arranged facing towards said top in order to be capable of being secured temporarily in rotation and in order to facilitate the mounting of this means of controlling 17b and of the piston 7 in the escape valve 1a, 1b, 1c in the course of the assembly of a suchlike valve 1a, 1b, 1c.

Figure 7:
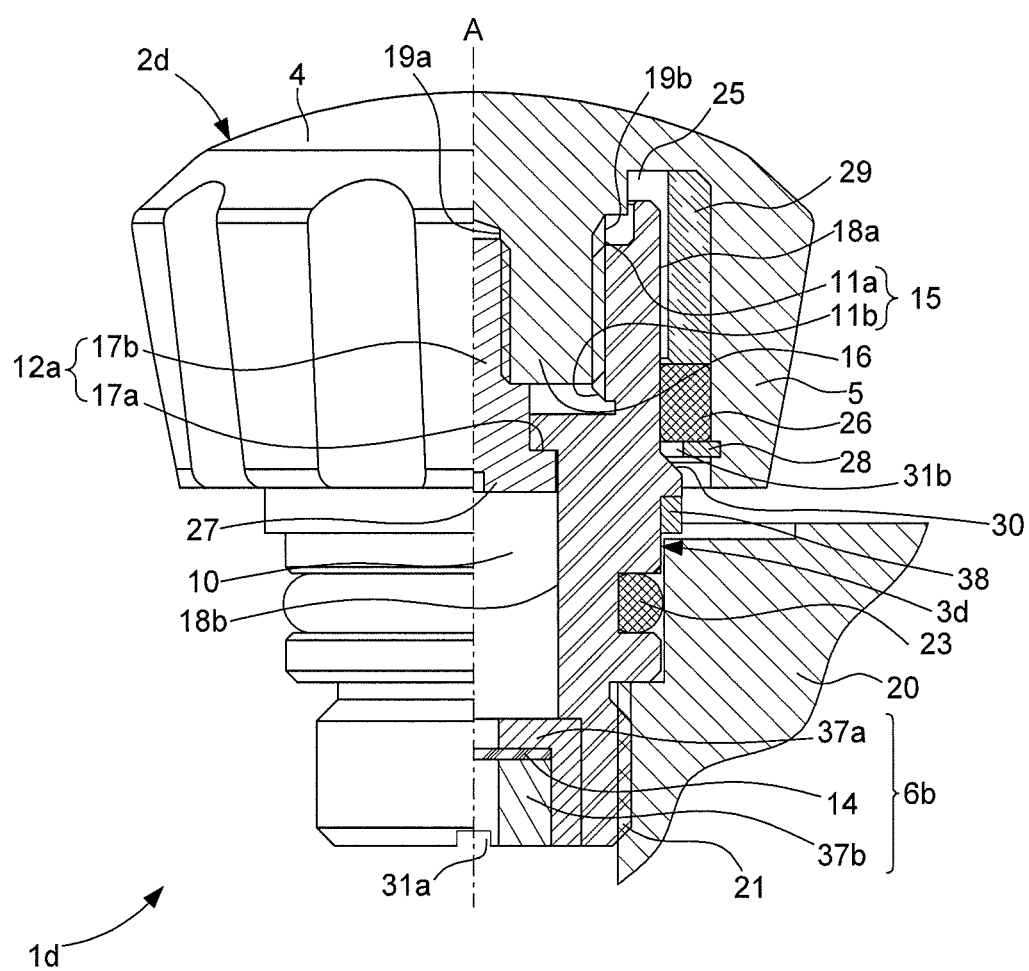
FIG. 7 represents a view similar to FIG. 6 in which the escape valve is in an open configuration, according to the fourth embodiment of the invention.

In the fourth embodiment visible in FIGS. 6 and 7, the pressure control module 6b includes a sealing element 14 situated in the fluid conduit 10 either in proximity to or inside the inlet 31a of the evacuation pipe. This sealing element 14 is arranged in this fluid conduit 10 in such a way as to obstruct the latter. This sealing element 14 includes a membrane 14 which is interposed between first and second fastening components 37a, 37b which connect it to the internal wall 18b of the fluid conduit 10. In other words, this membrane 14 is pinched between these two fastening components 37a, 37b. A suchlike membrane is arranged in order to be:
- permeable to the gases and to establish a fluid communication from the interior of the case towards the exterior when the pressure in the interior of the case exceeds a predetermined value, and
- impermeable to the liquids circulating from the exterior of the case towards the interior of the case.

Thus, in this configuration, given the presence of an overpressure in the interior of the case, the fluid F, in this particular case the gaseous helium, comes into contact with the membrane 14 which is permeable to the gases, which permits the fluid F to pass through it and to circulate in the fluid conduit 10 as well as the fluid passage of the outlet channel in order to be evacuated to the exterior of the case. It should be noted that, thanks to the presence of this membrane, the liquids are stopped and the sealing of the case is assured. Furthermore, a suchlike membrane is composed of a film of polymer that is impermeable to water and permeable to gases. Typically, the film polymer is carried by a substrate that is porous to gases. Advantageously, this membrane may be a membrane as sold by the Gore company under the reference "Acoustic vent GAW331".

Thus, in these different embodiments, the pressure control module 6a, 6b of this valve 1a to 1d makes it possible to regulate the variations of pressure in the interior of the watch case caused, for example, by the diver returning to the surface.

In addition, the valve 1a to 1d may include a visual indicator 38 of an axial position of the valve head 2a to 2d relative to the tube 3a to 3d, in particular a first or a second axial position of this valve head 2a to 2d. A suchlike visual indicator 38 is visible in FIG. 3 relative to the second embodiment of the valve 1b. This visual indicator 38 may be a ring which is arranged in a housing of complementary form defined in the external wall 18a of the tube 3b. This visual indicator 38, which preferably has a colour which is different from those of the external walls 18a of this tube 3b and of the valve head 2b, is positioned in this external wall 18a in such a way as to be covered/uncovered by the base of the axial skirt 5. Thus, a suchlike visual indicator 38 is likely to be obscured by the base of this axial skirt 5 when the valve head 2b is in the first axial position and is made visible when the valve head 2b is in an axial position different from this first position, in particular when it is in the second axial position, by being uncovered in whole or in part by this base of the axial skirt 5.

With reference to FIGS. 2, 3, 5, 7 and 8, when the escape valve 1a to 1d is parameterized by the closed configuration to the open configuration by the application of a force on the valve head 2a to 2d intended for unscrewing the tube 3a to 3d, the outlet channel of this valve 1a to 1d is then placed in fluid communication with the interior of the case. In this context, the valve head 2a to 2d is held fixed, in particular radially, thanks to the blocking elements 12a, 12b and/or the axial guide elements 15. In this configuration, the excess of fluid F is then evacuated through the outlet channel. This evacuation of this excess of fluid F is described below by way of example for the embodiment of the valve 1c visible in FIGS. 4, 5 and 8. More particularly, in FIG. 8, in the course of this evacuation, this excess of fluid F leaves the case in order to penetrate into the valve 1c at the level of the inlet 31a included in the opening defined in the lower portion of the tube 3c and in the direction of the arrow with the reference 45a. This fluid F then exerts a pressure force on the bearing surface 34 of the actuating means 9 resulting in compression of the elastic member 8 and thus raising of the piston 7. In this configuration, the fluid F then circulates in the lower compartment 13b of this conduit 10 in the direction of the arrows with the reference 45b before penetrating into the upper compartment 13a by passing through the central opening provided in the interior bearing surface 24. Subsequently, in the direction of the arrows with the reference 45c and 45d, this fluid F leaves the upper compartment 13a in order to pass through the fluid passage included between the external wall 18a of this tube 3c and the interior wall of the axial skirt 5 of the valve head 2c as far as the outlet 31b of this outlet channel included between the interior wall of the base of the axial skirt 5 and the external wall 18a of the tube 3c.

Advantageously, the sealing of a suchlike escape valve 1a to 1d is improved by the fact that the valve head 2a to 2d is dissociated from the pressure control module 6a, 6b thereby rendering the manipulation of this valve head 2a to 2d without influence on the sealing element 14 or the axial positioning of the piston 7. In fact, the state-of-the-art valves are frequently subjected to modifications of the axial positioning of the piston in the course of manipulations of the valve head at the source of leaks of fluid F, even though the pressure force of this fluid F is lower than the threshold pressure force.

The invention claimed is:

1. An escape valve for a timepiece, comprising:
    an outlet channel arranged to be in fluid communication with an interior of a case of said timepiece when the escape valve is in an open configuration in order to evacuate an excess of fluid, said escape valve including,
        a tube intended to be fixed in the case of the timepiece,
        a valve head provided with a cover and with an axial skirt which is adapted to be placed in different axial positions in relation to said tube,
        a pressure control module separate from the valve head arranged in the interior of a fluid conduit provided in the tube, and
        axial guide elements by screwing defined in the valve head and the tube configured to control displacement of the valve head relative to the tube in the different axial positions; and
    blocking elements preventing a disassociation between the valve head and said tube, said blocking elements being included in an external wall or internal wall of the tube and in the valve head.

2. The escape valve according to claim 1, wherein the blocking elements include an abutment included in the internal wall of the fluid conduit of said tube and a means of controlling the course of the valve head intended to cooperate with said abutment when the valve head is displaced relative to tube in particular in order to prevent a disassociation between the valve head and said tube.

3. The escape valve according to claim 2, wherein the means of controlling the course of the valve head is an element inserted in a body of the valve head by being connected mechanically to an interior wall of a central element for connecting the valve head.

4. The escape valve according to claim 2, wherein the abutment is integrally formed with the internal wall of the fluid conduit of said tube.

5. The escape valve according to claim 2, wherein the abutment is included in an insert fixed on the internal wall of the fluid conduit of said tube.

6. The escape valve according to claim 1, wherein in the blocking elements are included in the external wall of the tube and in the axial skirt of the valve head.

7. The escape valve according to claim 1, wherein the blocking elements include a retaining ring of annular form and a circular shoulder, said shoulder being provided with a bearing surface against which said ring is likely to come into abutment.

8. The escape valve according to claim 7, wherein a retaining ring is included in:
    a groove of complementary form defined in the axial skirt when the circular shoulder is included in the external wall of the tube, or
    a groove of complementary form defined in the external wall of the tube when the circular shoulder is included in the axial skirt.

9. The escape valve according to claim 1, wherein the axial guide elements include first and second guide zones defined in whole or in part respectively in an external wall of a central connecting element included in the cover of the valve head and in the internal wall of the fluid conduit of the tube in particular in an upper compartment of this conduit.

10. The escape valve according to claim 1, wherein the axial guide elements include first and second guide zones defined in whole or in part respectively in an external wall of a central connecting element included in the cover of the valve head and in an insert fixed on an internal wall of the fluid conduit of said tube in particular in an upper compartment of this conduit.

11. The escape valve according to claim 1, wherein first and second guide zones are adapted to be in engagement by screwing for an open or closed configuration of said valve.

12. The escape valve according to claim 1, wherein the pressure control module includes a piston and an elastic member, said piston being housed in the interior of the fluid conduit of the tube and the elastic member being arranged in said fluid conduit in order to cooperate with the piston, said piston being configured in order to move axially depending on the variations of pressure in the interior of the case.

13. The escape valve according to claim 1, wherein the pressure control module includes a sealing element situated in the fluid conduit between first and second fastening components, said sealing element containing a membrane arranged to be permeable to the fluid and to establish a fluid communication from the interior of the case towards the exterior when said internal pressure exceeds a predetermined value and impermeable to the liquids circulating from the exterior of the case towards the interior of the case.

14. The escape valve according to claim 1, wherein it includes a visual indicator of an axial position of the valve head relative to the tube, in particular from a first or from a second axial position of this valve head.

15. A timepiece comprising:
    an escape valve, comprising an outlet channel arranged to be in fluid communication with an interior of a case of said timepiece when the escape valve is in an open configuration in order to evacuate an excess of fluid, said escape valve including,
        a tube intended to be fixed in the case of the timepiece,
        a valve head provided with a cover and with an axial skirt which is adapted to be placed in different axial positions in relation to said tube,
        a pressure control module separate from the valve head arranged in the interior of a fluid conduit provided in the tube,
        axial guide elements by screwing defined in the valve head and the tube configured to control displacement of the valve head relative to the tube in the different axial positions, and
    blocking elements preventing a disassociation between the valve head and said tube, said blocking elements being included in an external wall or internal wall of the tube and in the valve head.

16. The escape valve according to claim 1, wherein the fluid is a gaseous fluid.

* * * * *